United States Patent
Higashida (12) 
(10) Patent No.: US 6,373,856 B1
(45) Date of Patent: Apr. 16, 2002

(54) COMMUNICATIONS SYSTEM FOR TRANSMISSION OF MULTIMEDIA DIGITAL DATA AND A METHOD THEREFOR

(75) Inventor: Masaaki Higashida, Katano (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/153,073

(22) Filed: Sep. 15, 1998

(30) Foreign Application Priority Data

Sep. 16, 1997 (JP) .............................. 9-250223

(51) Int. Cl.⁷ ................................. H04J 3/24
(52) U.S. Cl. .................... 370/474; 370/395.65
(58) Field of Search .............. 370/395, 395.6, 370/395.64, 395.65, 345.6, 503, 509, 516, 474; 375/240, 240.01, 240.25, 240.26

(56) References Cited

U.S. PATENT DOCUMENTS

| | | | |
|---|---|---|---|
| 5,467,342 A | | 11/1995 | Logston et al. |
| 5,533,021 A | | 7/1996 | Branstad et al. |
| 5,652,627 A | * | 7/1997 | Allen .......................... 348/497 |
| 5,892,535 A | * | 4/1999 | Allen et al. ..................... 348/9 |
| 6,246,701 B1 | * | 6/2001 | Slattery ....................... 370/503 |

FOREIGN PATENT DOCUMENTS

| | | |
|---|---|---|
| EP | 0 768 798 | 4/1997 |
| JP | 8-307859 | 11/1996 |

OTHER PUBLICATIONS

Varma S: "MPEG–2 Over ATM: System Design Issues", Digest of Papers fo the Computer Society Computer Conference Compcon, US, Los, Alamitos, IEEE Comp. Soc. Press, vol. Conf. 41, Feb. 25, 1996, pp. 26–31, XP000628461, ISBN: 0–8186–7414–8.

Hideyoshi Tominaga et al: "A Video Coding Method Considering Cell Losses in ATM–Based Networks," Signal Processing Image Communication, NL, Elsevier Science Publishers, Amsterdam, vol. 3, No. 4, Sep. 1, 1991, pp. 291–300, XP000234970, ISSN: 0923–5965.

T.Bannai et al: "DVCPRO—The Digital Future", International Broadcasting Convention, Sep. 12–16, 1997, xpoo2166267.

* cited by examiner

*Primary Examiner*—David R. Vincent
(74) *Attorney, Agent, or Firm*—Wenderoth, Lind & Ponack, L.L.P.

(57) ABSTRACT

A coding device encodes image data with the coding self-contained within specific image data units, and supplies the encoded data stream to a packetizer to generate packets from the encoded image data stream, and a packet header adding device adds to each packet a packet header containing time information whereby the temporal position of the packet is determined. Thus, temporal information associated with data received after recovery of an error can be known immediately by the receiver even when an error occurs on the communications network over which a data stream containing image data, audio data, and other information is transmitted.

13 Claims, 10 Drawing Sheets

Fig.2

| H0 | SC0 | SC1 | VA0 | VA1 | VA2 |
|---|---|---|---|---|---|

| A0 | V0 | V1 | ... | V12 | V13 | V14 |
| A1 | V15 | V16 | ... | V27 | V28 | V29 |
| A2 | V30 | V31 | ... | V42 | V43 | V44 |
| A3 | V45 | V46 | ... | V57 | V58 | V59 |
| A4 | V60 | V61 | ... | V72 | V73 | V74 |
| A5 | V75 | V76 | ... | V87 | V88 | V89 |
| A6 | V90 | V91 | ... | V102 | V103 | V104 |
| A7 | V105 | V106 | ... | V117 | V118 | V119 |
| A8 | V120 | V121 | ... | V132 | V133 | V134 |

Fig.3

ID DATA OF A DIF BLOCK

| | BYTE POSITION NUMBER | | |
|---|---|---|---|
| | BYTE0 (ID0) | BYTE1 (ID1) | BYTE2 (ID2) |
| MSB | $SCT_2$ | $Dseq_3$ | $DBN_7$ |
| | $SCT_1$ | $Dseq_2$ | $DBN_6$ |
| | $SCT_0$ | $Dseq_1$ | $DBN_5$ |
| | FSC | $Dseq_0$ | $DBN_4$ |
| | Arb | FSC | $DBN_3$ |
| | Arb | Res | $DBN_2$ |
| | Arb | Res | $DBN_1$ |
| LSB | Arb | Res | $DBN_0$ |

Fig. 4

PACK HEADER TABLE

| UPPER\_LOWER | 0000 | 0001 | 0010 | 0011 | 0100 | 0101 | 0110 | 0111 | ---- | 1111 |
|---|---|---|---|---|---|---|---|---|---|---|
| 0000 | | | | | | | | | | |
| 0001 | | | | | | | | | | |
| 0010 | | | TIME CODE | | | | | | | |
| 0011 | | | BINARY GROUP | | | | | | | |
| 0100 | | | | | | SOURCE | SOURCE | | | |
| 0101 | | | | | | SOURCE CONTROL | SOURCE CONTROL | | | |
| 0110 | | | | | | | | | | |
| ---- | | | | | | | | | | |
| 1111 | | | | | | | | | | NO INFO |

Fig.5

MAPPING OF PACKET IN SSYB DATA

| SSYB NUMBER | THE FIRST HALF OF EACH CHANNEL | THE SECOND HALF OF EACH CHANNEL |
|---|---|---|
| 0 | RESERVED | RESERVED |
| 1 | RESERVED | RESERVED |
| 2 | RESERVED | RESERVED |
| 3 | TC | TC |
| 4 | BG | RESERVED |
| 5 | TC | RESERVED |
| 6 | RESERVED | RESERVED |
| 7 | RESERVED | RESERVED |
| 8 | RESERVED | RESERVED |
| 9 | TC | TC |
| 10 | BG | RESERVED |
| 11 | TC | RESERVED |

Fig.6

MAPPING OF TIME CODE PACK

525/60 SYSTEM

| | MSB | | | | | | | LSB |
|---|---|---|---|---|---|---|---|---|
| PC0 | 0 | 0 | 0 | 1 | 0 | 0 | 1 | 1 |
| PC1 | CF | DF | TENS OF FRAMES | | UNITS OF FRAMES | | | |
| PC2 | PC | TENS OF SECONDS | | | UNITS OF SECONDS | | | |
| PC3 | BGF0 | TENS OF MINUTES | | | UNITS OF MINUTES | | | |
| PC4 | BGF2 | BGF1 | TENS OF HOURS | | UNITS OF HOURS | | | |

COMMUNICATIONS SYSTEM FOR TRANSMISSION OF MULTIMEDIA DIGITAL DATA AND A METHOD THEREFOR

BACKGROUND OF THE INVENTION

1. Field of the Invention

The present invention relates to a communications system and method for communicating compression coded image data, audio data, and additional information via a transmission path such that a temporal sequence of the data can be correctly reconstructed even after a transmission path error occurs.

2. Description of the Prior Art

The development of communication systems using optical fibers and other high speed transmission paths has greatly increased communication capacity. This has spurred the development of digital communication systems, which are now used not only for digital computer data, but also for transmitting digitized image signals, audio signals, and related additional information.

Asynchronous transfer mode (ATM) systems, for example, can operate at speeds in excess of 155 megabits/second, and practical ATM systems for communicating digital data are now available.

Formal standards for ATM systems have been adopted by the International Telecommunication Union—Telecommunication Standardization Sector (ITU-T) and the ATM Forum, for example, and numerous related publications have been issued.

Japanese Patent Laid-Open Publication 8-307859 (referred to below as prior art example 1), for example, teaches a means for transmitting image, audio, and related data coded for commercial digital VCR use over an ATM network. A method for allocating the moving picture data of this digital VCR data stream to ATM cells is disclosed in this prior art example 1.

Figure 10:
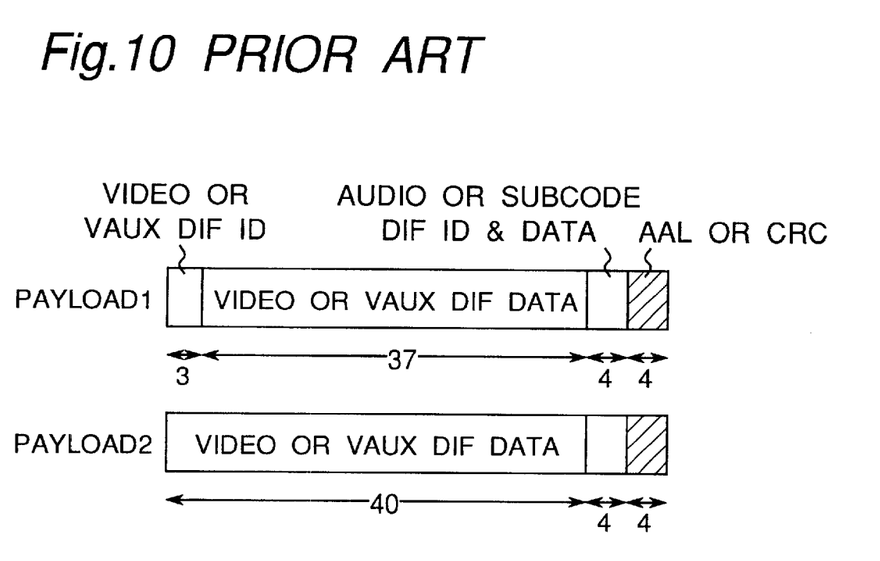
FIG. 10 is an explanatory view showing a byte allocation of payloads in the prior art.

More specifically, as shown in FIG. 10, an 80-byte DIF (digital interface) block is split into two 40-byte parts, and the remaining 8-byte part of the 48-byte ATM cell payload is used for e.g. error correction parity. Alternatively, a 4-byte portion of the remaining 8 bytes is used for error detection code. In another method of the above-noted prior art example 1, three 80-byte DIF blocks are joined to form a single 240-byte data block, which is then split into five 48-byte ATM cells.

A further method for writing moving picture data to ATM cells is a so-called "MPEG over ATM" method taught in "Video On Demand Specification 1.0, af-saa-0049.000", issued by The ATM Forum Technical Committee on Audio-visual Multimedia Services in December 1995 (referred to below as prior art example 2). Numerous descriptions of this specification have also been published. Basically, MPEG over ATM is a method for joining two continuous MPEG2 Single Program Transport Streams (STPS), each 188 octets long, into one 376 octet stream to which an 8-byte AAL 5 trailer is added, and then allocating this 384-byte stream to be split into eight ATM cells, each cell corresponding to a 48-octet payload, for data transmission.

A further another method for writing moving picture data to ATM cells is disclosed in U.S. Pat. No. 5,533,021 (referred to as prior art example 3, hereinafter). In this prior art example 3, a transport system (TS) packet stream sequence is split into a plurality of packets in the ATM adaptation layer and mapped into a cell size AAL-5 Protocol Data Units (PDUs). In this example, however, there is no suggestion or teaching of a feature of appending time information to every packet for identifying the location thereof.

These conventional methods are, however, involved with problems or drawbacks as to be described below.

Specifically, in these conventional methods, temporal information or time code data indicating when each payload was coded is not contained in each payload. As a result, when an error occurs in the communications network, the receiver is unable to determine the time of error recovery, resulting in disruption of reproduction of images associated with the payload in which the error occurred.

Figure 11:
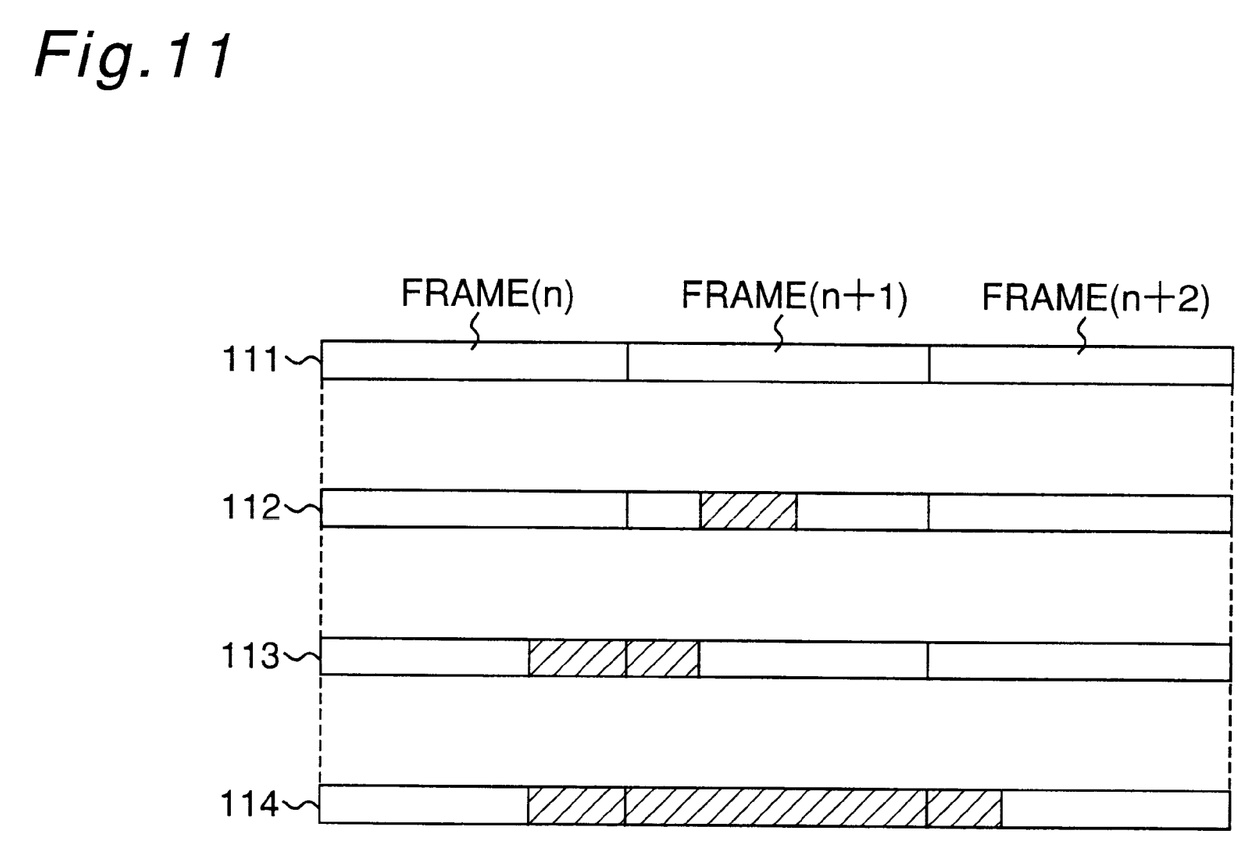
FIG. 11 is a conception view for explaining the problems in the prior art.

This problem is described more specifically with reference to accompanying FIG. 11.

The top row 111 in FIG. 11 represents three continuous frames of data to be transmitted where the frames are identified as frame n, frame n+1, and frame n+2. The places at which an error occurs during transmission over the communications network are indicated with hatching in rows 112, 113, and 114.

For example, when a transmission load increases to a point exceeding a processing capacity of an ATM switch on an ATM communications network, a problem of cell loss is caused. When cell loss occurs, an error in successive bursts as indicated in FIG. 11 occurs.

The error is confined within frame n+1 in row 112, but expands to frame n and n+1 in row 113, and moreover in row 114 starts in frame n, continues through frame n+1, and extends into frame n+2. When an error occurs as shown in FIG. 11 and the error is recovered, there is no means available for identifying at what point in these successive frames error recovery occurred. More specifically, if error recovery occurs in frame n+1 in row 112, frame n+1 in row 113, or frame n+2 in row 114, there is no method for determining to which frame the data received immediately after error recovery belongs. As a result, the data for frames n and n+1 in row 113 may be merged into one frame of data, and data for frames n and n+2 in row 114 may be merged. In addition, error recovery may occur in the same frame in which the error occurred in row 112, for example, but there is no means of determining that the data before and after error recovery can be processed as coming from the same frame because there is no means of detecting that the error and error recovery occurred in the same frame.

When the segment in which an error occurred is re-transmitted, it is necessary to determine where the error occurred. This error determination is, however, not possible with the method according to the prior art example 1. It is therefore necessary to re-transmit the entire data block. It should be noted that the above-described problems with prior art example 1 occur regardless of the length of the error.

The above-described problem in the conventional method is involved due to lack of the time code data or time information in each cell payload, for identifying where or to what period in the image signal stream the image information contained in a given cell payload belongs.

In the conventional method using MPEG2 encoding which is a combination of interframe predictive motion compensation coding and discrete cosine transform (DCT) coding, when an error in the code stream occurs as a result of an error on the communications network, the error is propagated to a macroblock coding unit. This means that, because of interframe predictive coding, the error is propagated along the time base.

The problem with MPEG2 coding likewise occurs due to the reason because relatively large macroblocks are used as the encoding unit and because interframe predictive coding is used.

With regard to the aforementioned problems, there is a need for a communication apparatus which allows to determine a time period or frame number in the image signal stream to which every successfully received packet belongs even when an error occurs in a communication network. There is a further need for a communication apparatus which surely prevents propagation of errors in the communication network.

SUMMARY OF THE INVENTION

To meet the above described needs, an essential object of the present invention is to provide a novel communications system for transmitting a stream of multimedia digital data over a distribution communications network via a transmission path by way of a transmitter.

The communications system of the present invention comprises: a data stream generator for coding image data, audio data, other associated additional information in a unit of an image data group and generating a continuous data stream thereof together with temporal information indicative of a temporal location of the image data group; a packetizer for segmenting the data stream into a plurality of data packets; a packet header adding device for adding the temporal information as a packet header to each data packet to thereby produce a transmission packet, wherein said temporal information is regularly updated based on a update cycle of the image data group; and a cell generator for dividing the transmission packet into a plurality of cells to be transmitted to the transmission path.

Another object of the present invention is to provide a novel method of transmitting a stream of multimedia digital data over a distribution communications network via a transmission path by way of a transmitter.

The method comprises the steps of: coding image data, audio data, other associated additional information in a unit of an image data group and generating a continuous data stream there of together with temporal information indicative of a temporal location of the image data group; segmenting the data stream into a plurality of data packets; adding the temporal information as a packet header to each data packet to thereby produce a transmission packet, wherein the temporal information is regularly updated based on a update cycle of the image data group; and dividing the transmission packet into a plural be transmitted to the transmission path.

As a result, a receiver can detect the temporal information, which is typically a time code, from each transmitted packet, and thereby determine the time at which a packet was encoded in the stream. Thus, the temporal information associated with data received after recovery of an error can be known immediately by the receiver even when an error occurs on the communications network over which a data stream containing image data, audio data, and other information is transmitted.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

A preferred embodiment of the present invention is described below with reference to the accompanying figures.

EMBODIMENT

Before the description proceeds, it should be noted that a communications apparatus according to the present embodiment is described in adaptation to ATM communication of image, audio, and related additional information in accordance with DVCPRO compression and transmission system conforming to SMPTE (Society of Motion Picture & Television Engineers) Standard (including a version under standardization), which are generically referred to as "DVCPRO", hereinafter.

An exemplary ATM standard conforms to any of the following but shall not be limited to: ITU-T, Q.2931; ITU-T, I.363; and ATM User-Network Interface Specification Version 3.0 (UNI3.0), Version 3.1 (UNI3.1), or Version 4.0 (UNI4.0), of The ATM Forum.

With regard to DVCPRO standard, an exemplary standard of data structure and video compression is disclosed in "Proposed SMPTE Standard SMPTE xx for Television Data Structure for DV Based Audio, Data and Compression Video, 25 Mb/s" (PT20.03A 4th Draft Jul. 31, 1998, For final edit), referred to as "Reference 1" hereinafter. An exemplary data stream format thereof is disclosed in "Proposed SMPTE Standard SMPTE xxx for Television Data Stream Format for the Exchange of DV Based Audio, Data and Compression Video over a Serial Data Transport Interface (SDTI)" (PT20.04A 4th Draft Feb. 28, 1998, referred to as "Reference 2" hereinafter.

According to the DVCPRO standard, data for one frame period is comprised of a plurality of DIF sequences each containing compressed image data, audio data and associated additional information such as time code data. In this method, an intraframe compression technique can be used such that DCT processing is applied to small image compression blocks, thus preventing error propagation within a frame. Image compression is also completed within a frame, and because there is no interframe dependency for image compression, there is no time-base propagation (frame to frame propagation) of errors.

Figure 1:
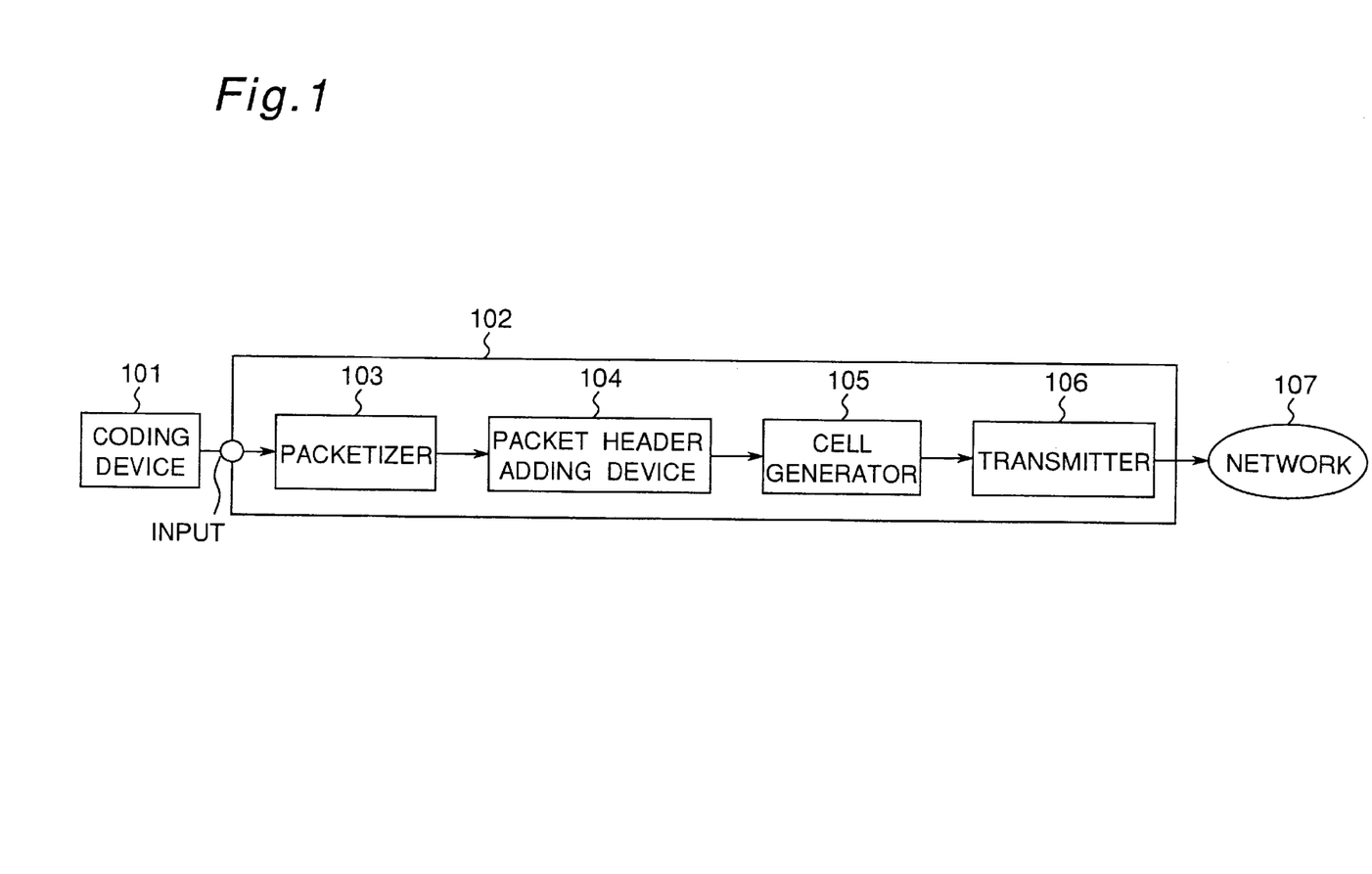
FIG. 1 is a typical block diagram of a communications apparatus according to a preferred embodiment of the present invention.

FIG. 1 shows a typical construction of a communication system which includes a communication apparatus 102 according to the present invention interposed between a coding device 101 and a network 107 for data communication.

In the coding device 101, a data stream is coded in frame units according to e.g. a DVCPRO standard, which the coded data is supplied to the communications apparatus 102. The communication apparatus 102 comprises a packetizer unit 103, packet header adding device 104, cell generator 105, and transmitter 106. The data coded by the coding device 101 is input to the communications apparatus 102 at the input point INPUT. The packetizer 103 receives the coded data stream and generates packets based on the coded data stream, and then the packet header adding device 104 affixes a packet header to each packet. The packet header contains, for example, time code information indicative of a temporal location of an associated packet.

The cell generator 105 then receives the packets with header added and generates ATM cells based on the packets. The transmitter 106 receives the ATM cells from the cell generator 105 and then applies the physical layer processing to thereby transmit the ATM cells over the network 107. An ATM network is used as an example of the network 107 in the present embodiment.

Figure 2:
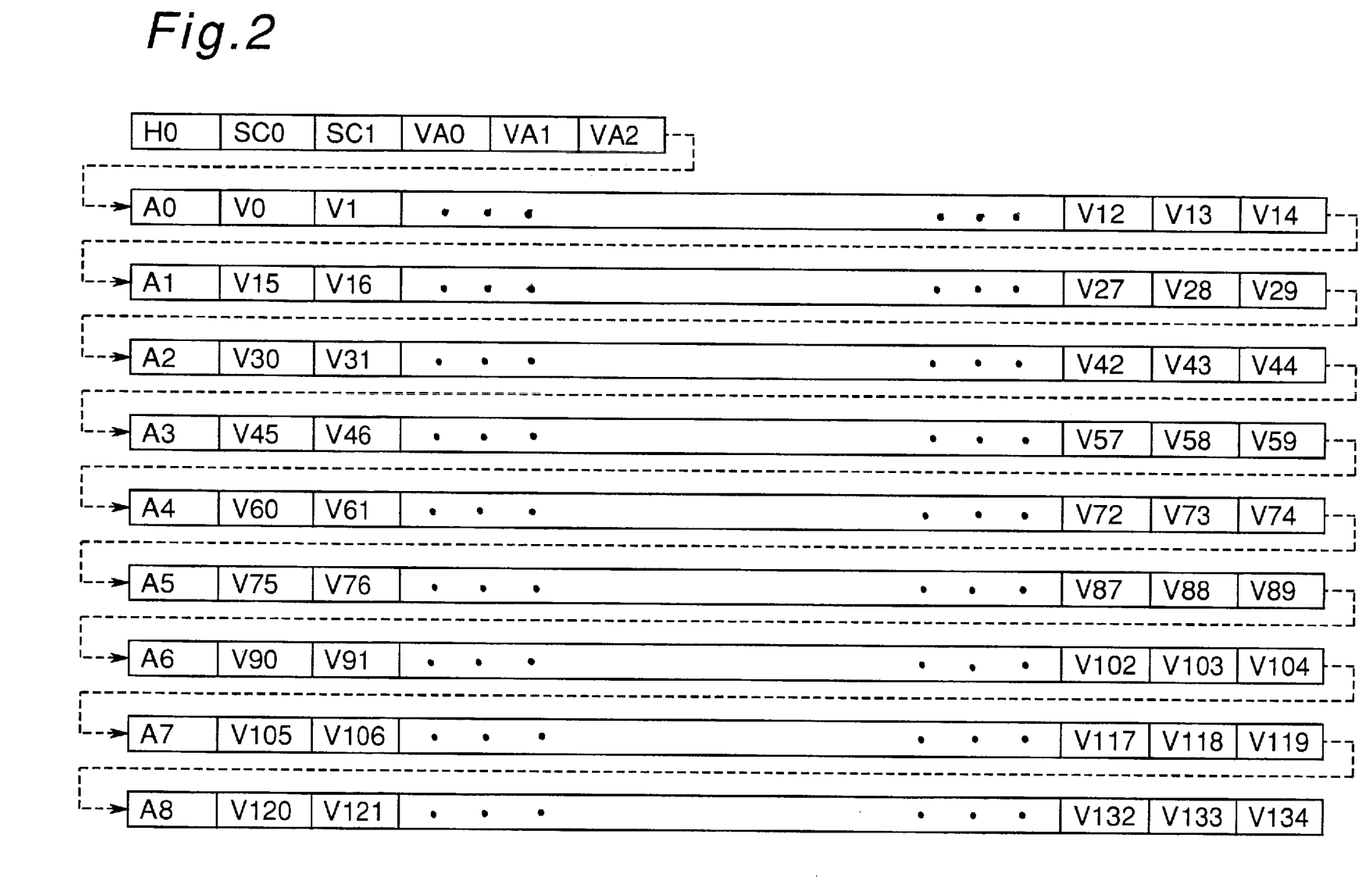
FIG. 2 shows a typical format of a subsequence processed by the communications apparatus shown in FIG. 1.

FIG. 2 shows a typical subsequence format output from the coding device 101 to be processed by the communication apparatus 102 shown in FIG. 1. The format of the subsequence will be briefly described below with reference to FIG. 2.

In the format shown in FIG. 2, the subsequence comprises a header DIF (digital interface) block H0; subcode DIF blocks SC0 and SC1; video AUXDIF blocks ("VAUX" hereinafter) VA0, VA1, and VA2; and audio DIF blocks A0, A1, ... A8 inserted to the video DIF block sequence. The video DIF blocks are identified as V0, V1, ... V134. Each DIF block has a structure of 80 bytes long in size, including a 3-byte identifier ID and a 77-byte data block.

The header DIF block H0 also contains subsequence control information; each of the audio DIF blocks A0–A8 contains audio data and auxiliary data relating to audio; each of the video DIF block V0–V134 contains video data; each of the video AUXDIF block VA0–V2 contains auxiliary data relating to the video; and the subcode DIF blocks SC0 and SC1 contain other additional information.

As known from FIG. 2, each sequence (referred to as "subsequence" hereinafter) contains 150 DIF blocks, including one header DIF block H0, two subcode DIF blocks SC0 and SC1, three video AUXDIF blocks VA0–V2, nine audio DIF blocks A0–A8, and 135 video DIF blocks V0–V134. Since each DIF block is 80 bytes long, therefore one subsequence contains 80×150=12,000 bytes.

In a 525/60 system (i.e., a typical NTSC system), each frame data is comprised of 10 subsequences. In a 625/50 system (i.e., a typical PAL system), each frame data is comprised of 12 subsequences. Note that the embodiment of the present invention is described in accordance with a 525/60 system by way of example only, and shall not be limited thereto.

Figure 3:
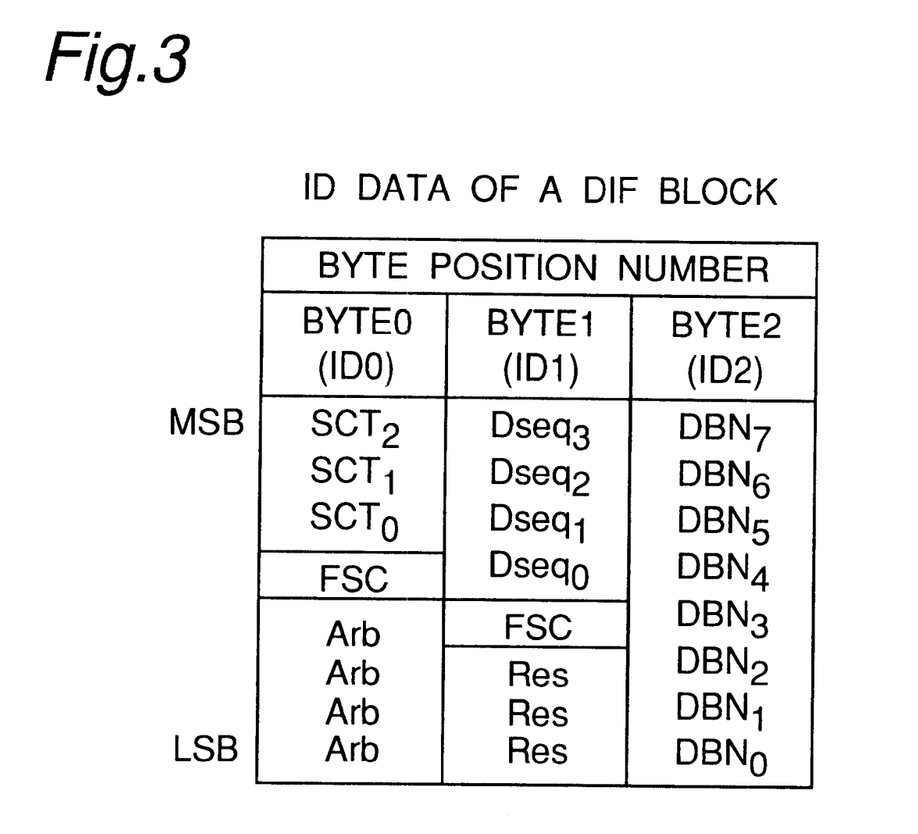
FIG. 3 is a typical DIF block identifier (ID) in the communications apparatus shown in FIG. 1.

FIG. 3 shows an exemplary content of the 3-byte identifier ID included in each DIF block in the present embodiment. As shown in FIG. 3, the first three bytes ID0–ID2 in each DIF block are the identifier ID part, wherein SCT indicates a section type, Arb represents Arbitrary bit indicative for sequence number, Dseq indicates a DIF sequence number, DBN indicates a DIF block number, and Res is a reserved data bit for future use. A specific bit is identified by the number appended to the preceding items SCT, Dseq and DBN.

The present invention relates particularly to the DIF sequence number "Dseq" and the DIF block number "DBN".

The DIF sequence number "Dseq" identifies the number of a subsequence. Because data in each frame is comprised of ten subsequences in a 525/60 system, the subsequence numbers 0 to 9 in each frame can be identified by the four bits of DIF sequence number Dseq3 to Dseq0.

The DIF block number "DBN" identifies the number of a specific DIF block in each subsequence by using the eight bits of DIF block numbers DBN7 to DBN0.

Using the DIF sequence number Dseq and DIF block number DBN, it is therefore possible to identify a location of a specific DIF block in a frame. Only by this definition, however, it is not possible to determine the time information (temporal location) of an associated frame per se having subsequences belonging thereto.

In the preferred embodiment of the present invention, each transmission packet is appended with a time code as temporal information indicative of the chronological sequence of the transmission packet. Thus, the receiver can accurately reconstruct the transmitted image information with no error in the time base sequence of the image based on the temporal information contained in each correctly received packet. Namely, an essential feature of the present invention resides in the fact of achieving addition of time sequence information to every transmission packet.

In order to determine the time information (temporal location) of a frame, a method of locating a time code is described below with reference to FIGS. 4 to 6.

Figure 4:
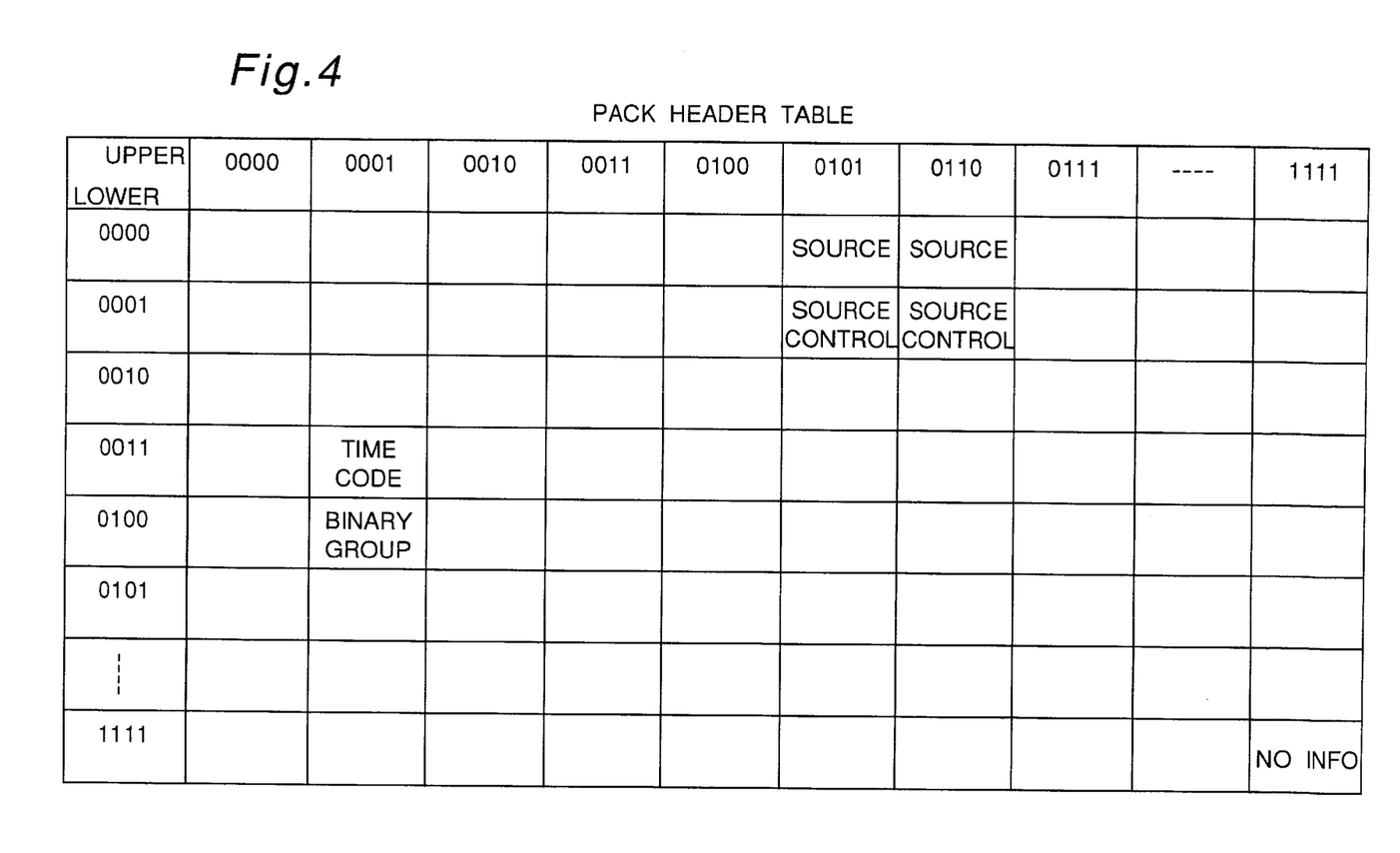
FIG. 4 is a pack header table view for explaining time information locating method.

FIG. 4 shows a pack header table (PC0 byte organization) where a time code is allocated at a block section defined by Upper 0001 and Lower 0100.

Figure 5:
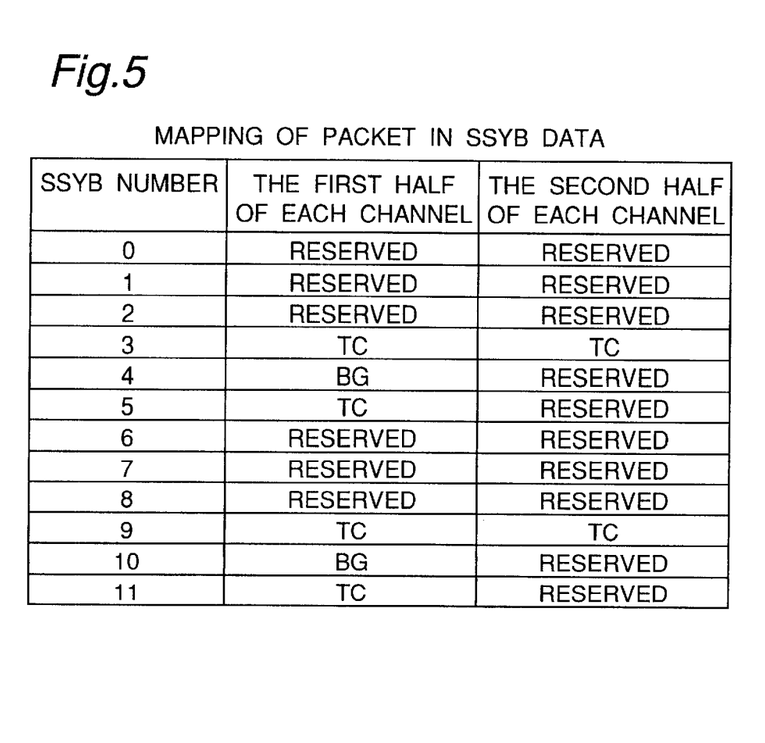
FIG. 5 is a pack arrangement table view for explaining time information locating method.

FIG. 5 shows a pack arrangement in SSYB data for each channel, where TC is a time code pack, BG is a binary group pack and Reserved indicates that a default value of all bits shall be set to "1". The data of TC and BG are same within a single video frame and the time code data is a LCT type.

Figure 6:
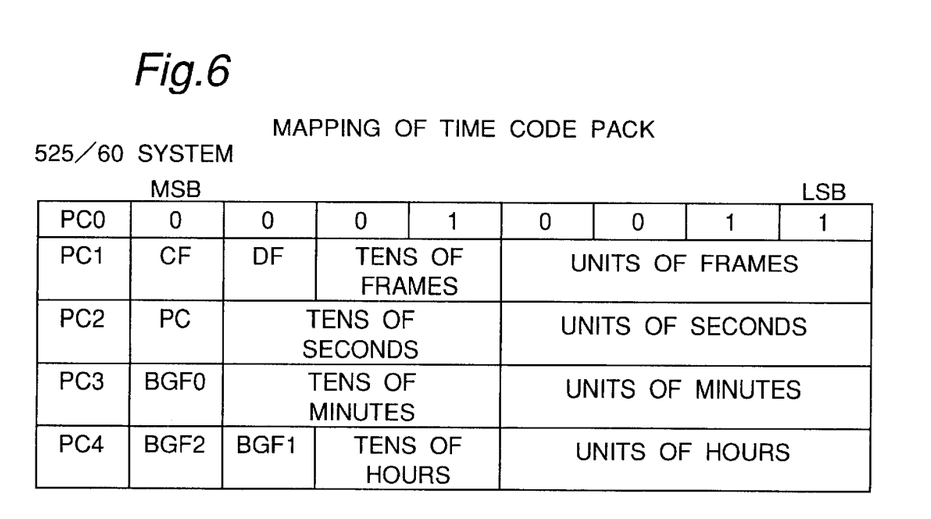
FIG. 6 is an explanatory view showing a mapping of time code pack in the 525/60 system

FIG. 6 shows a mapping of time code pack in the 525/60 system, where CF is color frame wherein 0 indicates unsynchronized mode and 1 indicates synchronized mode, DF denotes drop frame flag wherein 0 indicates non drop frame time code and 1 indicates drop frame time code, PC denotes biphase mark polarity correction wherein 0 indicates even and 1 indicates odd, and BGF denotes binary group flag, which detail information is defined in SMPTE 12M. The time code data mapped to the time code packs remains the same within each video frame.

Figure 7:
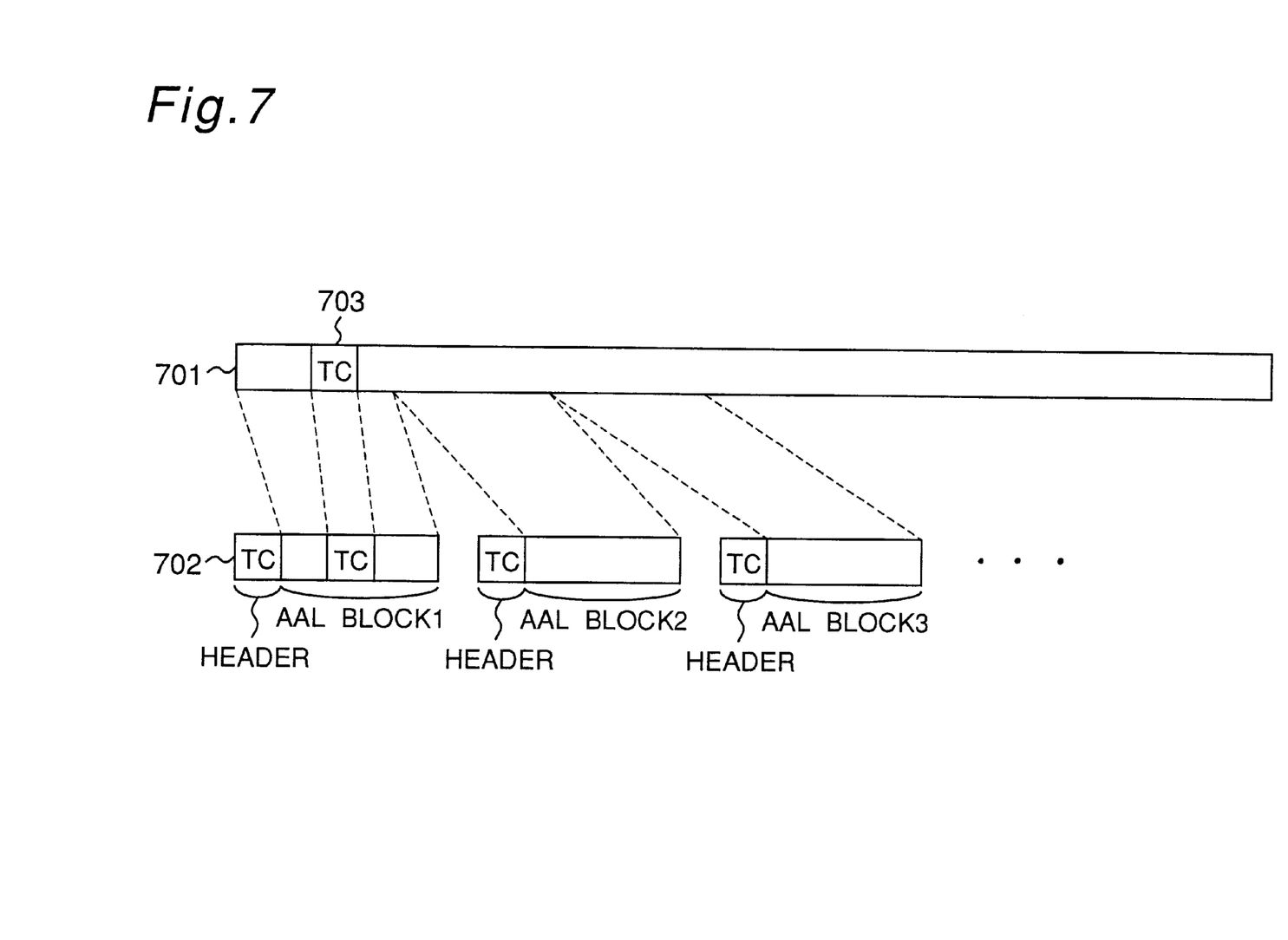
FIG. 7 is a schematic view for explaining a method of determining time information in one frame.

FIG. 7 shows a method of determining location in one frame, i.e., time information or temporal location to which an associated DIF block belongs within a frame.

In FIG. 7, 701 denotes a DIF sequence, i.e., subsequence which contains an original time code TC indicative of an associated frame. The time code TC is contained in the subcode DIF blocks SC0 and SC1 (see FIG. 2). In this example, only one time code TC of four bytes is shown.

The subsequence 701 is approximately split into a plurality of AAL blocks for application to an ATM adaptation layer for data transmission as to be described later. Each AAL block is comprised of a plurality of DIF blocks, but all of the AAL blocks do not contain the time code TC. In this example, only a first AAL block 1 contains the time code, and the other AAL blocks do not contain the time code. Therefore, the time code data TC obtained by copying the original time code TC contained in the subsequence 701 is added as a header to the beginning portion of every AAL block to thereby produce a plurality of transmission blocks (referred to as "transmission packet(s)" hereinafter) 702. Thus, the time information associated with DIF blocks in each AAL block can be determined, namely, a temporal location in a frame can be determined.

Next, a method of producing the transmission block is described below with reference to FIGS. 8A and 8B.

Figure 8A:
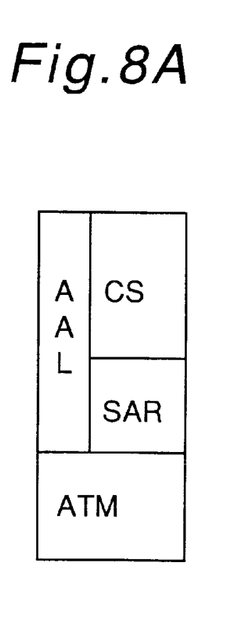
FIG. 8A is a schematic view showing a typical construction for producing transmission packets and ATM cells.
Figure 8B:
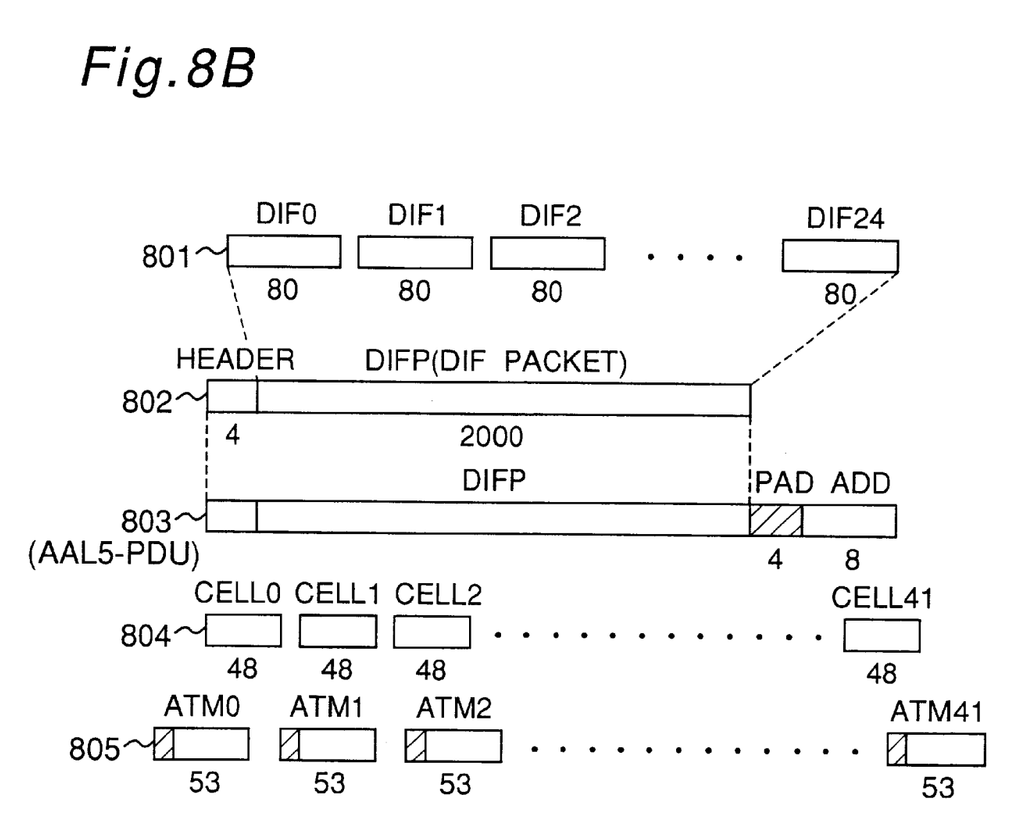
FIG. 8B is an explanatory view showing a process of a typical transmission packet generation and ATM cell division.

FIGS. 8A and 8B show a typical construction and process for producing transmission packets and ATM cells. In FIG. 8A, AAL denotes an ATM Adaptation Layer, which includes a convergence sublayer CS and segmentation and re-assembly sublayer SAR, and ATM denotes the ATM Layer.

Note that the present embodiment is described below as generating transmission packets each containing 25 DIF blocks, but the present invention shall not be limited to this number of DIF blocks.

Referring to FIG. 8B, in step 801, 25 DIF blocks are sequentially numbered as DIF0 to DIF24 for one transmission packet, where each DIF block is 80 bytes long.

In step 802, produced is a DIF packet (DIFP) which is comprised of 25 DIF blocks, i.e., 80×25=2000 bytes long, and then a time code, for example, is added as a packet header to the beginning of each DIF packet (DIFP). This time code as the packet header provides the time information required to determine the time base location of the DIF packet (DIFP), thereby producing a transmission packet which corresponds to each transmission block 702 shown in FIG. 7.

A typical time code is four bytes long in a format of, for example, HH:MM:SS:FF, where HH is an hour, MM is a minute, SS is a second, and FF is a frame number. Thus, for example, if the time code for frame n is 01:02:03:00, the time code for frame n+1 is 01:02:03:01, frame n+2 is 01:02:03:02, and so forth. It is therefore possible to determine the time base location of each transmission packet by increment of the frame number. In this format, transmission packets belonging to the same frame all have the same time code.

It should be further noted that the 4-byte header contains one byte indicating the hour, one byte indicating the minute, one byte indicating the second, and one byte indicating the frame number.

In step 803, note that AAL Protocol 5 (AAL 5) is used as the ATM Adaptation Layer for ATM communications in the present embodiment. The AAL 5 protocol data unit (PDU) in step 803 comprises 4 bytes of header and a DIF packet (DIFP) of 2000 bytes plus 4 bytes of padding Pad together with 8 bytes of CRC-32 or other additional information. The four padding bytes are used to ensure that the byte size of each transmission packet is an integer multiple of the 48-byte payload in each ATM cell. Each AAL 5-PDU thus is totally 2016 bytes long in size.

In step 804 of the segmentation and re-assembly sublayer SAR, each AAL 5-PDU of 2016 bytes is segmented into 42 ATM cell payload blocks (designated by Cell 0 through Cell 41) each having the fixed length of 48 bytes.

In step 805 of ATM Layer, an ATM cell header of 5 bytes is added to each ATM cell payload to complete the 42 ATM cells (designated by ATM0 through ATM41), each ATM cell being 53 bytes long.

Figure 9:
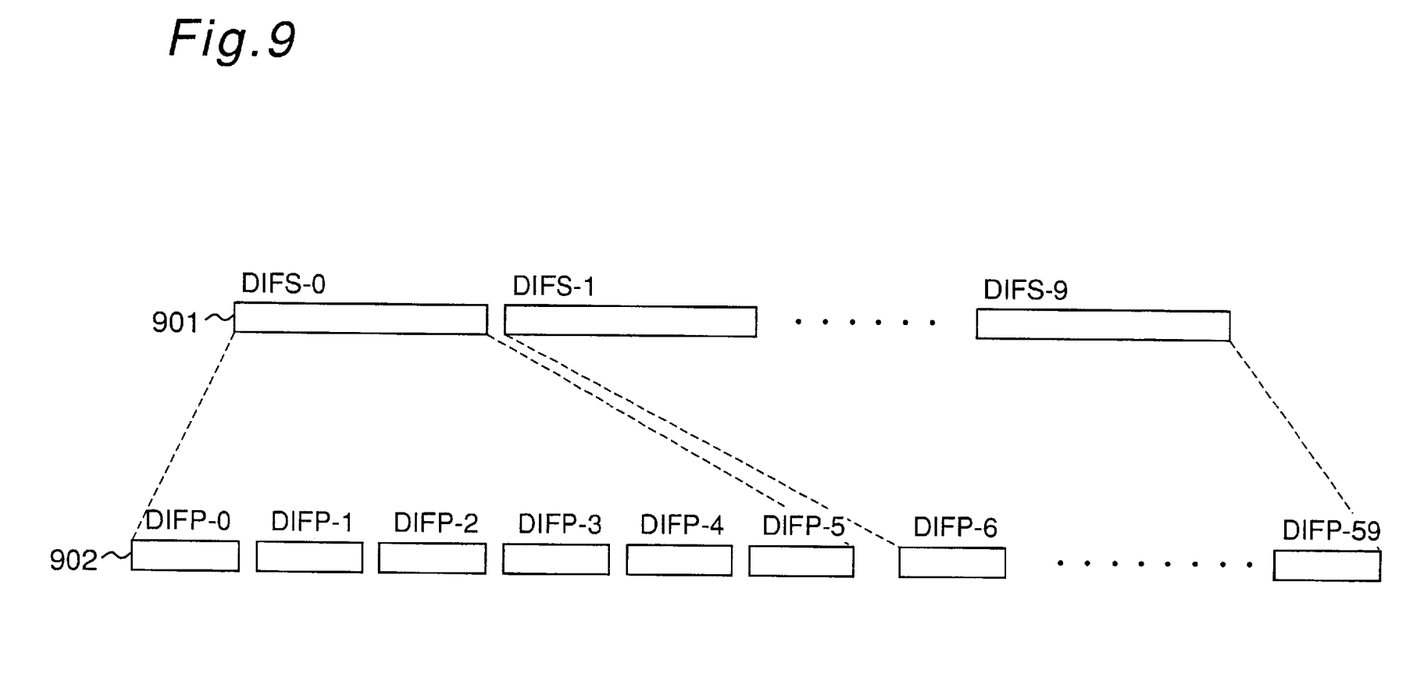
FIG. 9 is an explanatory view showing a method of generating DIF packets from the DV data for a single frame.

FIG. 9 shows a method of generating DIF packets from the DV data for a single frame in the communication apparatus shown in FIG. 1.

As shown in FIG. 9, one frame of DV data consists of ten subsequences DIFS-0 to DIFS-9 in step 901 where the number (0 to 9) appended to each subsequence DIFS indicates the order or location of each subsequence in the DV data stream for one frame.

Each subsequence DIFS-0 to DIFS-9 is divided into six DIF packets in step 902 (designated by DIFP-0 to DIFP5, . . . , DIFP-54 to DIFP-59). One frame of DV data therefore consists of 60 DIF packets DIFP-0 TO DIFP-59.

As described above, each subsequence comprises 150 DIF blocks while each DIF packet comprises 25 DIF blocks as shown in FIG. 8B. Six DIF packets (DIFP) are therefore generated from one subsequence.

FIG. 9 shows the division of each subsequence DIFS into six DIF packets (DIFP) (e.g. from DIFS-0 into six DIF packets DIFP-0 to DIFP-5). Each of the following subsequences DIFS is similarly divided into six sequentially numbered DIF packets DIFP, and one frame of DV data is thus divided into totally 60 DIF packets (DIFP-0 through DIFP-59).

Each DIF packet (DIFP) in step 902 of FIG. 9 corresponds to one DIF packet (DIFP) shown in step 802 in FIG. 8B.

Next, the operation of the present invention for generating the packets and cells is described below with reference to FIG. 1 relating to FIGS. 8A, 8B and FIG. 9.

The coding device 101 shown in FIG. 1 codes image data, audio data, and other additional information to generate DV data comprising ten subsequences per frame. This subsequence data is then input sequentially to the input point INPUT of the communications apparatus 102. The ten subsequences for each frame are shown in step 901 in FIG. 9 (designated as DIFS-0 through DIFS-9).

In the packetizing step 902, the packetizer 103 generates six DIF packets (DIFP) from each subsequence of step 901. This process involves simply generating each DIF packet (DIFP) from an assembly of 25 DIF blocks, which the operation is achieved by simply dividing one subsequence data (DIFS) into six segments, and can therefore be achieved by means a simple circuit. As already described above, each of the DIF packets (DIFP) obtained in step 902 is the DIF packet (DIFP) obtained in step 802 of FIG. 8B.

A header such as e.g. time code data is then added to each DIF packet (DIFP) by the packet header adding device 104, thereby producing the transmission packets as shown in step 802 in FIG. 8B. The time code data as the temporal information is regularly updated based on a update cycle of e.g. a frame of the image data by means of a timer and the like (not shown).

Note that, as the time code written as the header, there can be used, for example, a time code indicating the chronological sequence of data coding operation executed by the coding device 101, and the writing of the time code onto each DIF packet (DIFP) can be achieved by transferring the time code to the packet header adding device 104 at the same time of the transfer of the DV data.

The cell generator 105 handles the conversion from the transmission packets containing DIF packets (DIFP) in step 802 to step 803 obtaining the AAL 5-PDU, conversion from the AAL 5-PDU in step 803 to step 804 obtaining the cells (Cell0–Cell41), and conversion from the cells (Cell0–Cell41) in step 804 to step 805 obtaining the ATM cells ATM0–ATM41.

The transmitter 106 then converts the ATM cells ATM0–ATM41 obtained in step 805 into the physical layer, and outputs the physical layer to the network 107.

It should be noted that the cell generator 105 for AAL 5 processing, and the transmitter 106 for physical layer processing and output to the network 107, can be easily implemented by means of numerous currently-available dedicated LSI (ASIC) devices.

As also previously described in step 802 of FIG. 8B, the same header (i.e., time code) is added to all transmission packets in the subsequences for a single frame. The time code is then incremented for the next frame, and the same process is repeated.

It will thus be apparent that it is possible by means of the preferred embodiment of the present invention to append to each transmission packet for transmission therewith temporal information indicative of the chronological sequence of the associated transmission packet. As a result, the receiver can accurately reconstruct the transmitted image information with no error in the time base sequence of the image based on the temporal information contained in each correctly received packet.

It should be noted that an essential feature of the present invention resides in the fact of adding time sequence information to every transmission packet, which each packet may be defined as a data structure of variable size. Insofar as this requirement is satisfied, the present invention can be varied in many ways without departing from the intended scope of the invention.

Furthermore, while the above preferred embodiment has been described with reference to ATM transmissions, the invention shall not be limited thereto and can be specifically applied to other communications methods and protocols, including Ethernet.

In addition, while AAL 5 has been used as an exemplary ATM Adaptation Layer for ATM communications, the ATM Adaptation Layer shall not be limited thereto. It is also possible to directly convert DIF packets to ATM cells without using an ATM Adaptation Layer.

A DVCPRO standard compression and transmission method has also been used as an exemplary compression method of the present invention, but other compression methods free of error propagation between compression units can also be used.

In a modified embodiment of the present invention, instead of the ATM communication of image, audio, and related additional information, another compression and transmission system conforming to commercial digital VCR standard may be also used. In this embodiment, the DV standard adopted by the HD Digital VCR Conference may be used as an exemplary commercial digital VCR standard. The DV standard teaches an intraframe compression technique whereby DCT processing is applied to small image compression blocks, thus preventing error propagation within a frame. Image compression is also completed within a frame, and because there is no interframe dependency for image compression, there is no time-base propagation (frame to frame propagation) of errors.

A time code is also used as the means of expressing the temporal location of a transmission packet in the preferred embodiment of the invention. However, the invention relates specifically to the addition of the same temporal information to all transmission packets associated with an encoding unit (image signal period) at a discrete point in time such that the image sequence can be correctly reproduced even when errors occur in the communications network. As a result, a simply incrementing sequence of numbers starting from zero, for example, can also be used as the time code data.

It will also be obvious that while error correction coding and error correction of the data is not discussed above, these can be easily implemented within the scope of the invention, and the addition of such coding and correction shall therefore not depart from the scope of the invention.

It will be further obvious that padding bit (Pad) is inserted during AAL 5-PDU generation to ensure that the length of the AAL 5-PDU in step 803 in FIG. 8B is an integer multiple of the ATM cell payload size. It is alternatively possible, however, to insert other information in place of the padding bytes, including text information or HTML (Hypertext Mark-up Language) code, for transmission with the image data and other encoded information. This can be accomplished by providing a means for inserting this information between the packet header adding device 104 and cell generator 105 shown in FIG. 1.

It is therefore possible by means of the present invention to add and transmit with each transmission packet time information indicative of the time at which the transmission packet was encoded. The receiver can therefore immediately detect the time information of each transmission packet from each normally received packet, and thereby accurately reconstruct images with no error in the time sequence of the images. It is therefore possible to provide a communication apparatus whereby high image quality is maintained.

Furthermore, because a compression technique whereby compression coding is completed within a self-contained data unit by a preferred embodiment of a communications apparatus, errors are not propagated and high image quality can be maintained.

Thus, in the present invention, temporal information associated with data received after recovery of an error can be known immediately by the receiver even when an error occurs on the communications network over which a data stream containing image data, audio data, and other information is transmitted.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A communications system for transmitting a stream of multimedia digital data over a distribution communications network via a transmission path by way of a transmitter, said system comprising:

a data stream generator for coding image data in a unit of an image data group and generating a continuous data stream thereof together with temporal information indicative of a temporal location of the image data group;

a packetizer for segmenting said continuous data stream into a plurality of data packets; and a packet header adding device for adding the temporal information as a packet header to each data packet to thereby produce a transmission packet corresponding to each data packet, respectively, wherein said temporal information is regularly updated based on an update cycle of the image data group, and wherein every transmission packet within a frame has the same temporal information.

2. The communications system as claimed in claim 1, wherein the temporal information is indicative of the chronological sequence of the transmission packet.

3. The communications system as claimed in claim 2, wherein the continuous data stream generated by said stream generator comprises a frame of image data, which comprises a predetermined number of subsequences.

4. The communications system as claimed in claim 3, wherein the continuous data stream generated by said data stream generator further comprises a second frame of image data, and
   wherein a time code of the second frame is incremented by one, in order to indicate that the second frame should be processed after the frame.

5. The communications system as claimed in claim 1, wherein said cell generator converts the transmission packets to AAL 5-PDU, converts the AAL 5-PDU to the ATM cell payload blocks, and converts the ATM cell payload blocks to ATM cells.

6. The communications system as claimed in claim 1, further comprising a cell generator for dividing each transmission packet into a plurality of cells to be transmitted to the transmission path.

7. The communications system as claimed in claim 1, wherein said data stream generator additionally codes audio data and additional information in the unit of the image data group.

8. A method for transmitting a stream of multimedia digital data over a distribution communications network via a transmission path by way of a transmitter, comprising:
   coding image data in a unit of an image data group and generating a continuous data stream thereof, together with temporal information indicative of a temporal location of the image data group;
   segmenting said data stream into a plurality of data packets; and
   adding the temporal information as a packet header to each data packet to thereby produce a transmission packet corresponding to each data packet, respectively, wherein said temporal information is regularly updated based on an update cycle of the image data group, and
   wherein every transmission packet within a frame has the same temporal information.

9. The method as defined in claim 8, further comprising determining in one frame, time information for a temporal location to which an associated DIF block belongs in a frame.

10. The method as defined in claim 9, further comprising:
    splitting a subsequence into a plurality of AAL blocks for application to an ATM adaptation layer for data transmission;
    obtaining the time code data by copying an original time code contained in the subsequence;
    adding the time code data as a header to the beginning portion of every AAL block to thereby produce a plurality of transmission packets; and
    determining the time information associated with the DIF blocks in each AAL block.

11. The method as defined in claim 8, wherein said producing a transmission packet further comprises:
    sequentially numbering a predetermined number of DIF blocks for one transmission packet;
    producing a DIF packet by assembling the plurality of DIF blocks; and
    adding a time code as a packet header to the beginning of the DIF packet, wherein the time code as the packet header provides the time information required to determine the time base location of the DIF packet.

12. The method as defined in claim 8, further comprising dividing the transmission packet into a plurality of cells to be transmitted to the transmission path.

13. The method as defined in claim 8, wherein said coding further comprises coding audio data and additional information in the unit of the image data group.

* * * * *